United States Patent [19]
Crisp, Jr.

[11] 3,974,795
[45] Aug. 17, 1976

[54] DIFFERENTIAL PRESSURE INDICATING DEVICE

[75] Inventor: Robert L. Crisp, Jr., Madison Heights, Mich.

[73] Assignee: Facet Enterprises, Inc. Filter Products Division, Madison Heights, Mich.

[22] Filed: June 18, 1975

[21] Appl. No.: 587,935

[52] U.S. Cl. .............................. 116/114 PV; 116/65; 116/DIG. 25; 116/DIG. 42
[51] Int. Cl.² .......................................... G08B 5/00
[58] Field of Search .............. 116/DIG. 42, DIG. 25, 116/65, 70, 114 PV

[56] References Cited
UNITED STATES PATENTS

| | | | |
|---|---|---|---|
| 2,719,485 | 10/1955 | Bendar | 116/DIG. 42 |
| 3,140,690 | 7/1964 | Siebel | 116/DIG. 42 |
| 3,212,471 | 10/1965 | Willis | 116/114 PV |
| 3,364,897 | 1/1968 | Mouwen | 116/114 PV |
| 3,646,906 | 3/1972 | Hammer | 116/114 PV |

Primary Examiner—S. Clement Swisher
Assistant Examiner—Denis E. Corr
Attorney, Agent, or Firm—Remy J. VanOphem

[57] ABSTRACT

A differential pressure indicating device includes a piston responsive to the differential between inlet and outlet pressures. The piston is retained in a normal position by the force of spring means, and which spring means releases the piston at a predetermined excessive differential pressure condition, whereupon the piston actuates an indicating member for indicating the condition. The device is reset by manually re-engaging the piston and the spring means subsequent to correcting the condition.

5 Claims, 2 Drawing Figures

DIFFERENTIAL PRESSURE INDICATING DEVICE

BACKGROUND OF THE INVENTION

1. Field of the Invention

This invention relates generally to pressure responsive devices and particularly to devices responsive to an excessive differential between inlet and outlet pressures. More particularly, this invention relates to a device of the type described which provides a resettable indication of excessive differential pressure.

2. Description of the Prior Art

Differential pressure responsive indicating devices are widely used, for example, in filter systems. These devices sense differential pressures across a pneumatic or hydraulic filter element such as occur when the element becomes clogged, and thereupon indicate that the filter element may require replacement or cleaning. It is important and desirable that the indication remains until the condition causing the excessive differential pressure is corrected and that false indications are readily detected.

SUMMARY OF THE INVENTION

This invention contemplates a pressure responsive indicating device including a piston affected by the differential between inlet and outlet pressures. The piston is retained in a normal position by the force of spring means which releases the piston at a predetermined excessive differential pressure. When the piston is thus released a magnet supported by the piston actuates a magnetic indicating member which thereupon protrudes from the device to indicate the excessive differential pressure. In order to reset the device it is required to re-engage the piston and the spring means subsequent to correcting the condition which caused the excessive differential pressure. False indications caused by shock or vibration as the excessive differential pressure is approached are detected by manually depressing the protruding indicating member. If the member remains depressed a false indication is assured, and if it returns to the actuated or protruding position a true indication of an excessive differential pressure condition is established.

One object of this invention is to provide a pressure responsive indicating device which will indicate an excessive differential between inlet and outlet pressures.

Another object of this invention is to provide a device of the type described which maintains its indication until the condition causing the excessive differential pressure is corrected, after which the device is resettable.

Another object of this invention is to provide a device of the type described including means maintained in a normal position by spring means and operative upon the differential pressure exceeding a predetermined level for overriding the affect of the spring means to actuate an indicator indicative of the excessive differential pressure.

Another object of this invention is to provide a device of the type described wherein false indications due to shock or vibration when the pressure differential is near the predetermined level may be detected.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
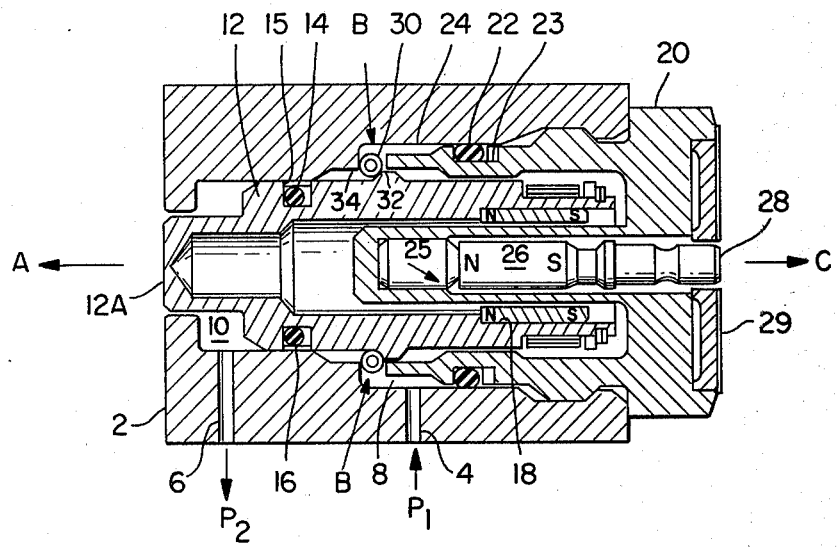
FIG. 1 is a sectioned side view of the invention showing a piston assembly thereof in a normal position.

Referring to the figures, a substantially cylindrical cover or case 2 has an inlet port 4 and an outlet port 6. Ports 4 and 6 communicate with the inlet and outlet portions of a gas or liquid filter system or with the upstream and downstream portions, respectively, of a hydraulic or pneumatic system (not shown) or any other such device which may experience a pressure differential across its inlet and outlet portions. Inlet port 4 communicates with a passage 8 and outlet port 6 communicates with a passage 10, and which passages 8 and 10 carry a liquid or gas which acts upon a piston assembly 12. Piston assembly 12 is supported within case 2 and carries a friction reducing sliding seal 14 in a groove 15 and adjacent an internal edge 16 of the case.

Piston assembly 12 carries a magnet member 18 arranged with its north (N) and south (S) poles as shown in the figures. A housing 20 is supported within case 2 and is sealed therein by an O-ring 22 disposed in a groove 23 and adjacent an internal edge 24 of the case. An assembly designated generally by the numeral 25 is displaceably supported within housing 20 and includes a magnet 26 having its north (N) and south (S) poles in substantial repelling alignment with the north (N) and south (S) poles of magnet 18 when piston assembly 12 is in a normal position as shown in FIG. 1. A pin member 28 is supported by magnet 26. Piston assembly 12 is maintained in the normal position by spring means 30 disposed intermediate an external rim 32 of the piston assembly and an internal flange 34 of case 2.

Spring means 30 is calibrated to release piston assembly 12 from its normal position when a differential pressure occurs across ports 4 and 6, i.e. when inlet pressure $P_1$ at port 4 exceeds outlet pressure $P_2$ at port 6, to indicate a malfunction of the system with which the invention is used. Thus, piston assembly 12 is thereupon displaced in direction A as indicated by the arrow in FIG. 1 against the force exerted by spring means 30 in direction B as indicated by the arrow. At a predetermined excessive differential pressure, piston assembly 12 moves completely through spring means 30, whereupon the poles of magnet 18 are disposed relative to the poles of magnet 26 so as to displace said latter magnet in direction C causing pin 28 to extend or protrude beyond an end cap 29 of housing 20 to provide an indication of the excessive differential pressure and causing end 12A of piston assembly 12 to extend beyond the end of case 2 as shown in FIG. 2.

In order to reset the device it is required to re-engage piston assembly 12 with spring means 30. This is accomplished by manually pushing end 12A of piston assembly 12 in direction A' as indicated by the arrow (FIG. 2) opposite to direction A (FIG. 1), after the condition causing the excessive differential pressure has been corrected. Upon resetting the device, assembly 25 is returned to the position shown in FIG. 1 and is maintained in that position through the repelling action of magnet 18 carried by piston assembly 12.

Figure 2:
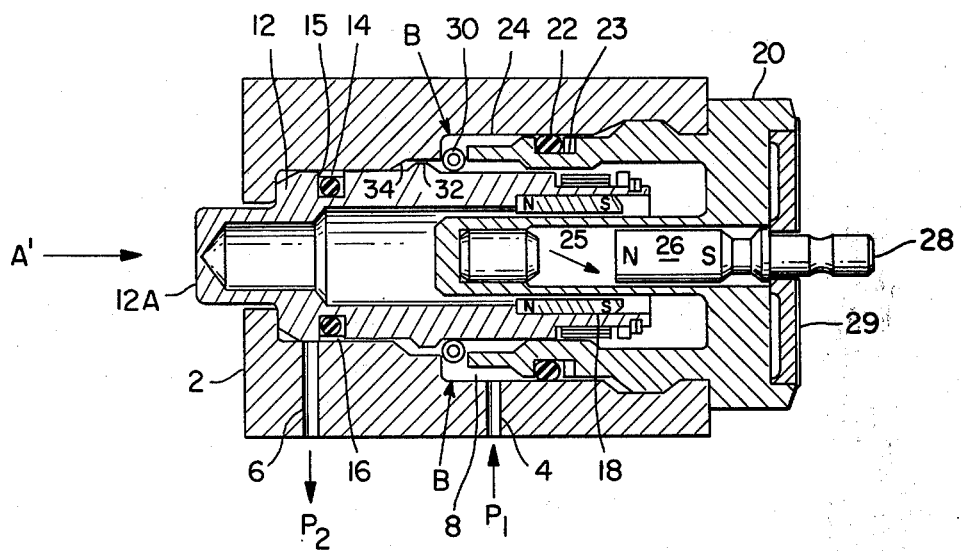
FIG. 2 is a sectioned side view of the invention showing the piston assembly in an actuated position, and wherein an indication of an excessive differential pressure is provided.

In this connection it is noted that when used with a filter or other system as heretofore indicated, the mechanism of FIGS. 1 and 2 is generally surrounded by a bowl or housing (not shown). Access to piston assembly 12 for resetting the device as heretofore noted can only be had by removing the surrounding housing and correcting the malfunctioning portion of the system.

It will be understood that with the structural arrangement described, false excessive differential pressure indications may be provided due to shock or vibration as the predetermined excessive differential pressure is approached so as to actuate pin assembly 25. An advantage of the present invention is that such false indications may be readily detected. This is accomplished by manually depressing pin 28 of assembly 25. If the pin remains as shown in FIG. 1, a false excessive differential pressure indication has been experienced. If pin 28 returns to the actuated position as shown in FIG. 2, a true excessive differential pressure indication has been experienced and the purposes of the invention have been achieved.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A device for indicating a predetermined excessive differential level between inlet and outlet pressures comprising:
   displaceable means displaceably arranged in a case and responsive to differential pressures communicated thereto through the case and including a piston carrying a magnetic member;
   spring means arranged with the displaceable means and the case for retaining the displaceable means in a normal position when the differential pressure is below a predetermined excessive level.
   the spring means releasing the displaceable means when the differential pressure is above the predetermined excessive level, whereupon the displaceable means is displaced in one sense;
   other displaceable means in cooperative arrangement with the first mentioned displaceable means, and actuated for being displaced in an opposite sense upon the first mentioned displaceable means being displaced in the one sense for indicating that the differential pressure is above the predetermined excessive level;
   the other displaceable means including an indicating member carrying a magnetic member, with the poles of said magnetic member being in substantial repelling alignment with the poles of the magnetic member carried by the first mentioned displaceable means when said first mentioned displaceable means is in the normal position; and
   the magnetic member carried by the other displaceable means being attracted by the magnetic member carried by the first mentioned displaceable means when said first mentioned displaceable means is released by the spring means and displaced in the one sense, whereupon the indicating member is displaced in the opposite sense for indicating the excessive differential pressure level.

2. A device as described by claim 1, wherein:
   the other displaceable means is displaceably supported in a housing carried in the case; and
   when the first mentioned displaceable means is released by the spring means and displaced in the one sense the indicating member is displaced in the opposite sense to protrude from the housing for indicating the excessive differential pressure level.

3. A device as described by claim 2, wherein:
   the first mentioned displaceable means extends beyond the case when said means is released by the spring means and displaced in the one sense.

4. A device as described by claim 3, wherein:
   the device is reset when the first mentioned displaceable means extending beyond the case is manually displaced in the opposite sense to re-engage the first mentioned displaceable means and the spring means, whereupon the repelling action of the magnetic members carried by the first mentioned and other displaceable means displaces the indicating member back within the housing to remove the excessive differential pressure level indication.

5. A device as described by claim 2, wherein:
   the indicating member protruding from the housing is manually displaced in the one sense to be within the housing;
   a false indication of the excessive differential pressure level is provided when the indicating member remains within the housing; and
   a true indication of the excessive differential pressure level is provided when the indicating member returns to protrude from the housing.

* * * * *

UNITED STATES PATENT AND TRADEMARK OFFICE
CERTIFICATE OF CORRECTION

PATENT NO. : 3,974,795
DATED : August 17, 1976
INVENTOR(S) : Robert L. Crisp

It is certified that error appears in the above—identified patent and that said Letters Patent are hereby corrected as shown below:

Column 3, line 46, after "level" delete "."
and insert --;--.

Signed and Sealed this

Third Day of May 1977

[SEAL]

Attest:

RUTH C. MASON
*Attesting Officer*

C. MARSHALL DANN
*Commissioner of Patents and Trademarks*